(12) United States Patent  
Wheeler (10) Patent No.: US 9,092,960 B2
(45) Date of Patent: Jul. 28, 2015

(54) RETAIL SECURITY SYSTEM

(75) Inventor: Wade Wheeler, Hillsboro, OR (US)

(73) Assignee: Mobile Tech, Inc., Lake Oswego, OR (US)

( * ) Notice: Subject to any disclaimer, the term of this patent is extended or adjusted under 35 U.S.C. 154(b) by 90 days.

(21) Appl. No.: 13/101,719

(22) Filed: May 5, 2011

(65) Prior Publication Data

US 2012/0280810 A1 Nov. 8, 2012

(51) Int. Cl.
*G08B 13/12* (2006.01)
*G08B 13/14* (2006.01)
*H04M 1/04* (2006.01)
*H04M 1/12* (2006.01)
*H04M 1/67* (2006.01)

(52) U.S. Cl.
CPC ............. *G08B 13/1445* (2013.01); *H04M 1/04* (2013.01); *H04M 1/12* (2013.01); *H04M 1/67* (2013.01)

(58) Field of Classification Search
CPC .... G08B 13/1445; G08B 13/14; G08B 13/00; G08B 25/00
USPC .......................................... 340/568.2, 539.11
See application file for complete search history.

(56) References Cited

U.S. PATENT DOCUMENTS

| | | | |
|---|---|---|---|
| 5,146,205 A | | 9/1992 | Keifer et al. |
| 6,549,130 B1 | * | 4/2003 | Joao .......................... 340/539.14 |
| 6,799,994 B2 | | 10/2004 | Burke |
| 7,002,467 B2 | * | 2/2006 | Deconinck et al. ........ 340/539.1 |
| 7,385,522 B2 | | 6/2008 | Belden, Jr. et al. |
| 7,626,500 B2 | | 12/2009 | Belden, Jr. et al. |
| 7,688,205 B2 | | 3/2010 | Ott |
| 7,696,857 B2 | * | 4/2010 | Kritt et al. ..................... 340/5.31 |
| 7,710,266 B2 | * | 5/2010 | Belden et al. ............... 340/568.3 |
| 7,737,843 B2 | | 6/2010 | Belden, Jr. et al. |
| 7,737,846 B2 | | 6/2010 | Belden, Jr. et al. |
| 8,289,131 B2 | * | 10/2012 | Cho et al. ..................... 340/5.51 |
| 2004/0113819 A1 | * | 6/2004 | Gauthey et al. ................. 341/34 |
| 2009/0079566 A1 | * | 3/2009 | Goldstein et al. .......... 340/568.1 |
| 2009/0183266 A1 | * | 7/2009 | Tan et al. ......................... 726/35 |
| 2009/0225166 A1 | * | 9/2009 | Dronge ......................... 348/155 |
| 2011/0187531 A1 | * | 8/2011 | Oehl et al. ................. 340/568.1 |

* cited by examiner

*Primary Examiner* — Kerri McNally
(74) *Attorney, Agent, or Firm* — Bruce A. Kaser (57) ABSTRACT

The invention is an improved security and product display system for use by retailers who sell hand-held electronics in stores. The system includes a combination of a mobile, hand-held electronics device (e.g., cell phone or like), a mounting member, and an adaptor cable that electrically connects the device to the mounting member. The device has power detection circuitry adapted to detect a break in the power circuit between device and mounting member. Detection of a circuit break causes the device to output a security alarm.

7 Claims, 7 Drawing Sheets

RETAIL SECURITY SYSTEM

TECHNICAL FIELD

The present invention relates to systems for efficiently communicating the theft-security status of a hand-held device offered for sale in a retail location.

BACKGROUND OF THE INVENTION

Cell phones, tablet devices, and other kinds of hand-held devices are commonly displayed for sale as an array of products at "Big Box" retail locations and in cell phone stores. Theft prevention and/or theft security is an ongoing issue for the merchants who sell these devices to the general public.

Theft security in the hand-held market has evolved over the years. A review of the prior art reveals that theft security for countertop displays of hand-held electronics probably commenced with the use of mechanical tethers (steel cables on reels or tether cords) that tied a large camcorder, or the like, to a countertop. Since then, anti-theft systems have become more sophisticated and often use tethered mounting members or "pucks" for mounting the hand-held (the hand-held is attached or sits on the puck). The puck is a mini-platform that may house its own electronics control board (ECB) for carrying out power (passing through power to the hand-held) and security functions.

In modern security systems, the tether is often a cord with one or more wires for providing device power to the puck and, also, power for security sensors to the puck. Short adaptor cables are then used to connect the power jack on the device to a similar fitting on the puck. It is common to use security sensors at the physical interface where the device contacts the puck. These sensors may take different forms, but in many cases, they consist of a spring-loaded push-button that is released when the device is removed from the puck. The button's release breaks an electric circuit that triggers an alarm. Sometimes, separate or "secondary" sensor cables, with similar sensors, connect the puck to other kinds of device parts that have the capability of being independently removed from the device, without removing the device from the puck (e.g., a removable camera lens).

Regardless of specific form, these sensors commonly involve triggering a switch or breaking a circuit during a theft or other unauthorized event that involves removing the hand-held from the display. It is common that the security breach signal is communicated to under-the-counter control electronics that output an alarm—the alarm could be audio or visual, or some other combination that warns the retailer of the security breach. However, whatever form the alarm actually takes, the under-the-counter system provides the alarm functions in response to a circuit break between the under-the-counter system and the puck or a circuit break occurring at the puck level.

Those familiar with retail theft security systems will immediately recognize the types of systems generally described above. These systems typically fill a niche that is unique to the display of large numbers of hand-held electronic devices in the retail market.

For those who supply security systems of this kind, one of the ongoing challenges relates to the fact that hand-held technology is continually evolving. Therefore, it is an ongoing challenge to build retail displays that offer security and yet can adapt to the retailer's need to swap-out new versions of hand-helds, as they come onto the market, in a way that is easy for the store manager to manage.

SUMMARY OF THE INVENTION

The invention disclosed here is an improved security and product display system for use by retailers for displaying arrays of hand-held electronics that are offered for sale to consumers. The hand-helds consist of cell phones, digital cameras, tablet devices, etc.

The system includes a combination of elements. One element is a mobile, hand-held electronics device that is adapted for wireless communication (e.g., cell phone or the like). This device is displayed on a countertop, typically mounted at an individual post position, although the mounting convention is not germane to the invention.

Another element is a mounting member that is used to attach the mobile device to the countertop, typically by a tether or similar means. The mounting member provides a platform for passing through power to the device from a power source. One common form of mounting member is called a "puck," although it is possible to use other forms having a variety of footprints and/or means for use as a mounting piece that helps mount the mobile device to a countertop or a wall.

A third element is an adaptor cable that electrically connects the device to the mounting member.

The mobile device has power detection circuitry that is adapted to detect whether an unbroken circuit exists between the device and mounting member, as created by the adaptor cable. Detection of a circuit break causes the device to output a security alarm.

The circuit break will be caused by a theft event, or the like, involving disconnection of the device from the mounting member by cutting the adaptor cable, tearing it off the display, or otherwise disconnecting it from either the device or the mounting member.

The mobile device is programmable ("mobile app") by the retailer. Software that is resident on the device enables it to detect the break in the circuit and generate a corresponding alarm event.

The alarm event may take many forms. For example, it may be nothing more than an audio alarm output by the device itself. Alternatively, the device could output a text message to the retailer; or a voicemail message; or, depending on the device, the GPS location of the device. In accordance with the invention, however, it is intended to take advantage of the hardware and software capabilities of the mobile device to handle alarm functions in lieu of, or as a supplement to, under-the-counter alarm electronics.

Therefore, and also in accordance with the invention, the retailer places a mobile app on the device that performs the desired security functions. The app enables the retailer to input a unique security code that is activated via the device touch-screen or similar input means. The security code is used to arm or disarm security functions, respectively.

The app also generates a serial number unique to the device and provides the serial number to an off-site location. There, the serial number is maintained by an off-site service, along with a back-up code, for arming or disarming the device should the retailer lose the retailer-generated code.

The concept disclosed here involves altering the hand-held so that it functions as the security device. The downloadable application converts the wireless device into what is effectively a stand-alone alarm module.

The invention as summarized above will become better understood upon review of the following description.

BRIEF DESCRIPTION OF THE DRAWINGS

In the drawings, like reference numerals and letters refer to like parts throughout the various views, and wherein.

DETAILED DESCRIPTION

Figure 1:
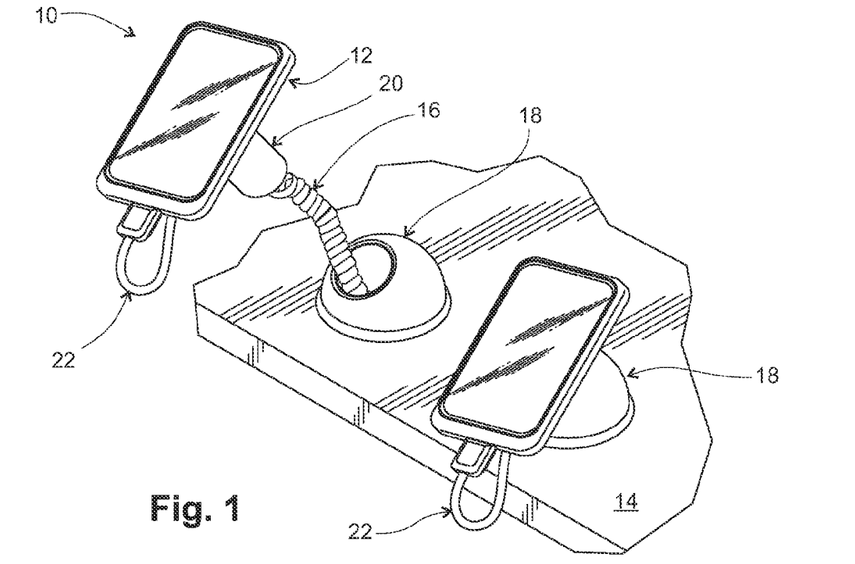
FIG. 1 is a pictorial view of a retail display showing how hand-held devices like cell phones or "smart phones" are typically displayed at a retailer's location.

Referring to the drawings, and first to FIG. 1, indicated generally at 10 is a retail security system constructed in accordance with a preferred embodiment of the invention. The idea underlying the security system disclosed here involves transforming a wireless communication device (e.g., cell phone or iPad (registered trademark of Apple, Inc.)) into an anti-theft device. In other words, the hand-held provides the functions necessary to indicate a theft event without necessarily relying upon conventionally-known security sensors or under-the-counter electronics that are designed to detect unauthorized removal or theft of the hand-held from the display.

With reference to FIG. 1, first, the hand-held is generally indicated by reference numeral 12. This device may be a typical cell phone with a touch screen. Alternatively, as indicated above, it could be a tablet device, as shown at 12 in FIG. 3.

Figure 3:
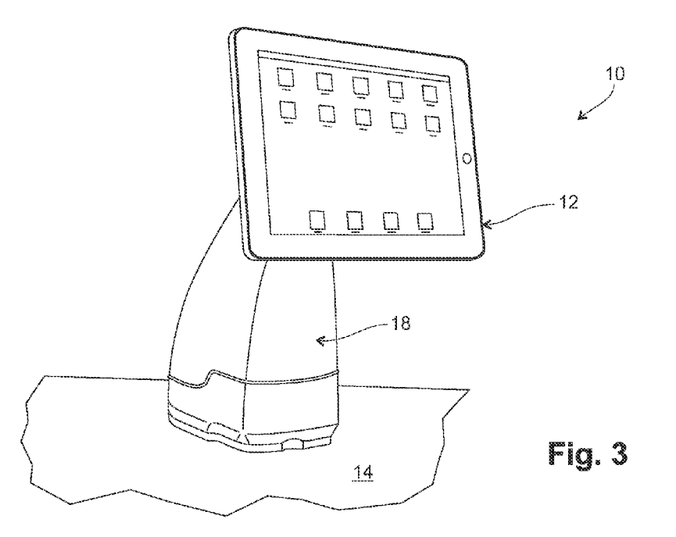
FIG. 3 is a view similar to FIG. 1, but pictorially illustrates one type of hand-held (a tablet device) mounted on a retail display countertop.

The device 12 is suitably mounted to a display surface 14 (see FIGS. 1 and 3). This may be done in any number of different ways known in the anti-theft or security field. In FIG. 1, as an example, the hand-held 12 is tethered by a "Curly-Q" cord 16 that extends through a base piece 18 on the counter. This cord 16 provides a form of physical security and may supply power.

Preferably, the cord 16 tethers a device mounting piece or "puck" 20 to the display. The hand-held 12 is mounted to the puck by a variety of techniques known in the art—the specific technique not being germane to the invention disclosed here. Also, as is common, the hand-held 12 is connected to the puck 20 by a short adaptor cable 22 (see, e.g., FIGS. 1-2, 4-5 and 9-11).

The system described here may take on different permutations. However, the common theme is to use the hand-held 12 as the means for providing an alarm to the retailer in the event of a theft event.

One likely scenario during a theft event is that the adaptor cable 22 will be disconnected or cut (indicated schematically at 24). Modern-day hand-helds have built-in hardware with the capability of detecting when the hand-held's connection to a power supply ends. It is therefore possible to take advantage of built-in power detection circuitry (indicated schematically at 26 in FIGS. 2 and 5) as a means for triggering a theft alarm.

Using cell phones as an example, it is possible to write applications that will cause the cell phone to perform certain functions in response to certain events. One of the more common and familiar examples involves a cell phone "beep" when it receives a text message or email. The cell phone can be programmed to generate a similar response when the cell phone's power circuit is broken, as is further described below.

Figure 2:
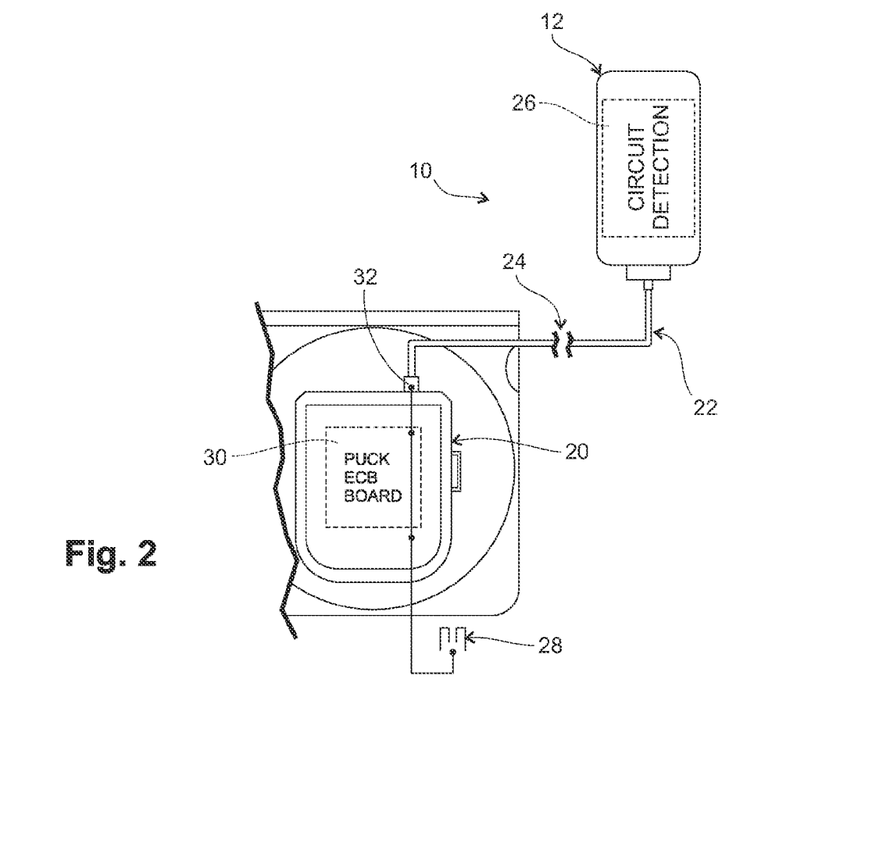
FIG. 2 is a schematic showing a cable connection between the hand-held and a tethered mounting puck.

Referring now to FIG. 2, the puck 20 will typically operate as a pass-through platform for transmitting power to the hand-held 12. The power source is schematically indicated at 28. It may be connected to a puck ECB board 30 by a tethered cable (like cable 16 shown in FIG. 1, for example) or other similar means.

Figure 4:
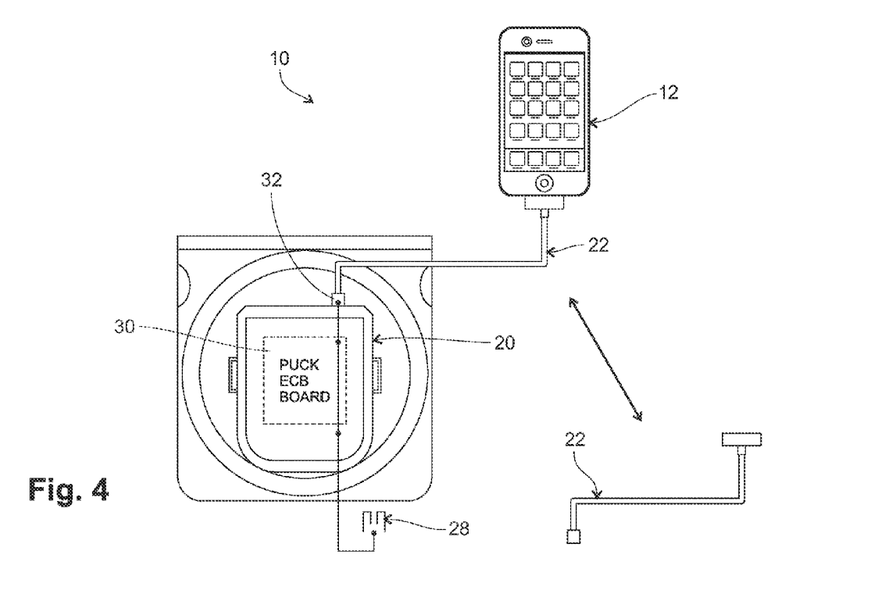
FIG. 4 is a view like FIG. 2, but illustrates how short adaptor cables are used to electrically connect the hand-held to the mounting puck.

A person skilled in the art would know that the ECB board 30 passes power onto the adaptor cable 22 via conventional connectors (see also, FIG. 4). The ECB board may also independently perform security functions or carry a battery for providing power to the hand-held on an intermittent basis.

Regardless of the various functions it may perform, the ECB board 30 creates a powered circuit in cable 22 that is detectable. The power in this circuit is interrupted if the cable tether (item 16) is cut or the puck 20 is ripped away from the cable 16; by unplugging the short adaptor cable 22 from either the hand-held 12 or the jack location (see item 32 in FIG. 2); or by cutting the adaptor cable 22 (see item 24 in FIG. 2). Either way, the break in the circuit is detectable by the hand-held. When this happens, the cell phone can be made to perform security functions or anti-theft functions.

The reader will appreciate that cell phone applications or apps, are well known in the art as applications that are add-ons or pieces of software that are added to a cell phone and cause the phone to perform selected functions that are, or may be, completely unrelated to making a phone call. As cell phone technology has progressed, cell phones have acquired greater computational capacity so as to perform tasks like e-mail, browsing the internet, and many other kinds of functions (games, music player, calculator, etc.) that go well beyond typical phone call functions. For example, one of the more common types of cell phone apps on a mobile phone, today, is SMS text messaging. It is believed SMS text messaging developed as a cell phone data service in or about the 90's. Since then, downloadable mobile software apps have grown, leading to the development of an ever-expanding array of cell phone apps.

Adapting the device 12 to operate as its own security alarm system involves writing mobile application software that may be pre-installed on a device during the course of its manufacture or, as is the case here, downloaded by the retailer.

As a person skilled in the art would understand, hand-helds typically run on hardware platforms that are specific to the manufacturer. Generally speaking, each platform for a mobile application will have its own integrated development environment that provides the tools necessary to allow the developer to write, test, and deploy the functions described here for the targeted platform environment. For the sake of assisting the reader, the following table generally summarizes the development environments for several well-known platforms that are available today:

| Platform | Programming language |
|---|---|
| Android | Java but portions of code can be in C, C++ |
| BlackBerry | Java |
| iOS | Objective-C |
| Java ME | Java |
| Macromedia Flash Lite | ActionScript |
| Microbrowser based | XHTML (WAP 2.0), WML (WAP 1.2) |
| Palm OS | C, C++, Pascal |
| WinDev Mobile | WLanguage |
| Windows Mobile | C, C++ |

The security functions or anti-theft functions performed by the cell phone 12 are called "alarm events" herein. These alarm events will now be described, referring first to FIG. 5.

As described above, the built-in power detection circuit 26 (item 34 in FIG. 5) has the capability of determining whether the adaptor cable 22 is disconnected, cut, etc., or whether power is otherwise interrupted in some fashion to the cell phone 12. Obviously, if the circuit remains unbroken, then the cell phone generates no alarm event (item 36 in FIG. 5). However, when the circuit is broken, the mobile device 12 can be programmed to trigger any number of different alarm events, depending on the capability of the specific device (item 38).

Figure 5:
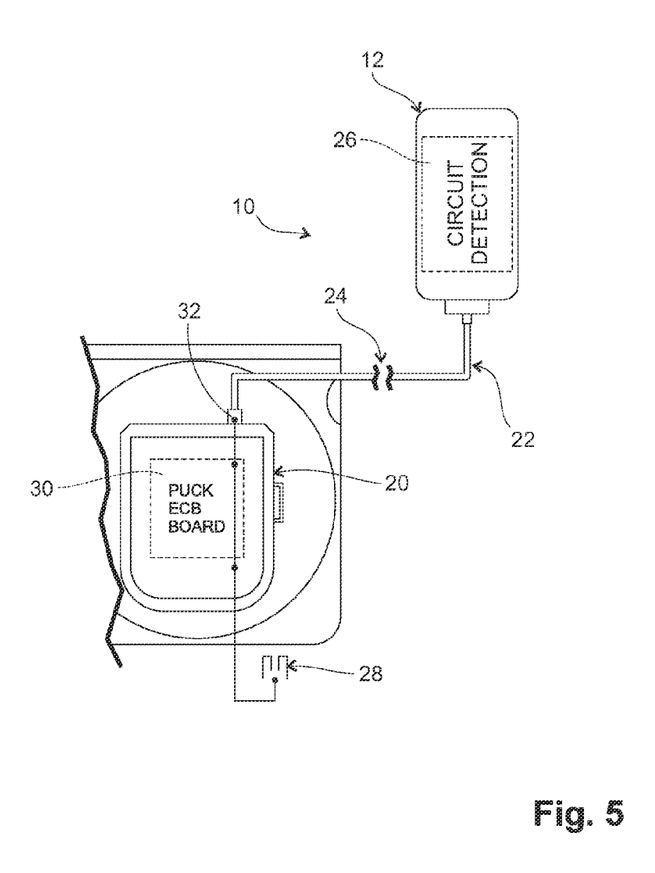
FIG. 5 combines FIG. 2 with a flowchart that illustrates how the hand-held triggers an alarm when a theft event occurs.

One alarm event involves the total deactivation of normal phone functions (item 40). At this point, the reader will appreciate that this description is largely directed to cell phones. However, there are other kinds of mobile, wireless communication devices that can be made to work in precisely the same way, although the device platform and, therefore, programming language will be different. The most common example is the iPad (registered trademark of Apple Corporation). However, there are GPS devices offered for sale in similar point of display environments that have wireless capability.

Referring again to FIG. 5, another kind of alarm event is simple audio output from the phone's speaker (item 42). This audio alarm event could be generated in different forms, i.e., a loud beeping noise or ringing noise. Because cell phones, as an example, now have the capability of pre-storing different kinds of pre-recorded sounds (e.g., ringtones), it would be possible to cause the phone to output a verbal message like "unauthorized removal."

Moreover, as indicated previously, point of display sales for devices of this kind typically involve an array of post-mounted positions. Posts can be numbered and tracked by theft security systems. Or, an audio message can state something like "disconnection at post 32." Therefore, the types of audio alarms can cover a wide variety of things.

With sophisticated, modern-day hand-helds, another type of alarm event might be an automated text message or email sent to the retailer (item 44). Similarly, the device 12 can also be programmed to generate an automated voice message to the retailer (item 46).

Finally, some devices may have the capability of outputting the GPS location of the device (item 48). Therefore, if the device 12 happened to be physically removed from the store, the device 12 could transmit GPS location to the retailer (or law enforcement) for tracking the location of the thief.

Figure 6:
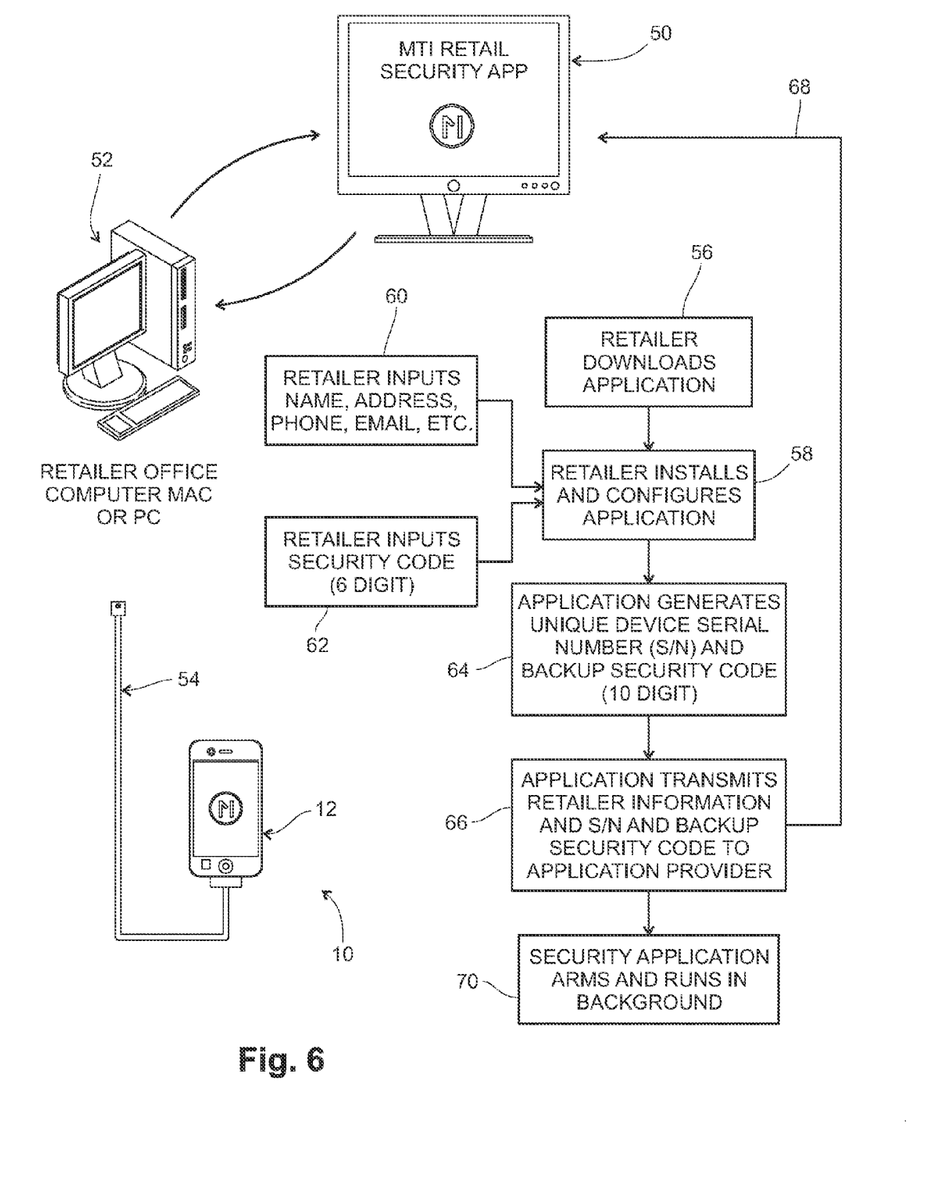
FIG. 6 is a system schematic that illustrates how a downloadable mobile phone app functions to make a hand-held device work as an alarm device, according to the invention.

Bearing the foregoing description in mind, the reader's attention is now directed to FIG. 6. The preferred programming details of the system 10 are as follows.

Figure 7:
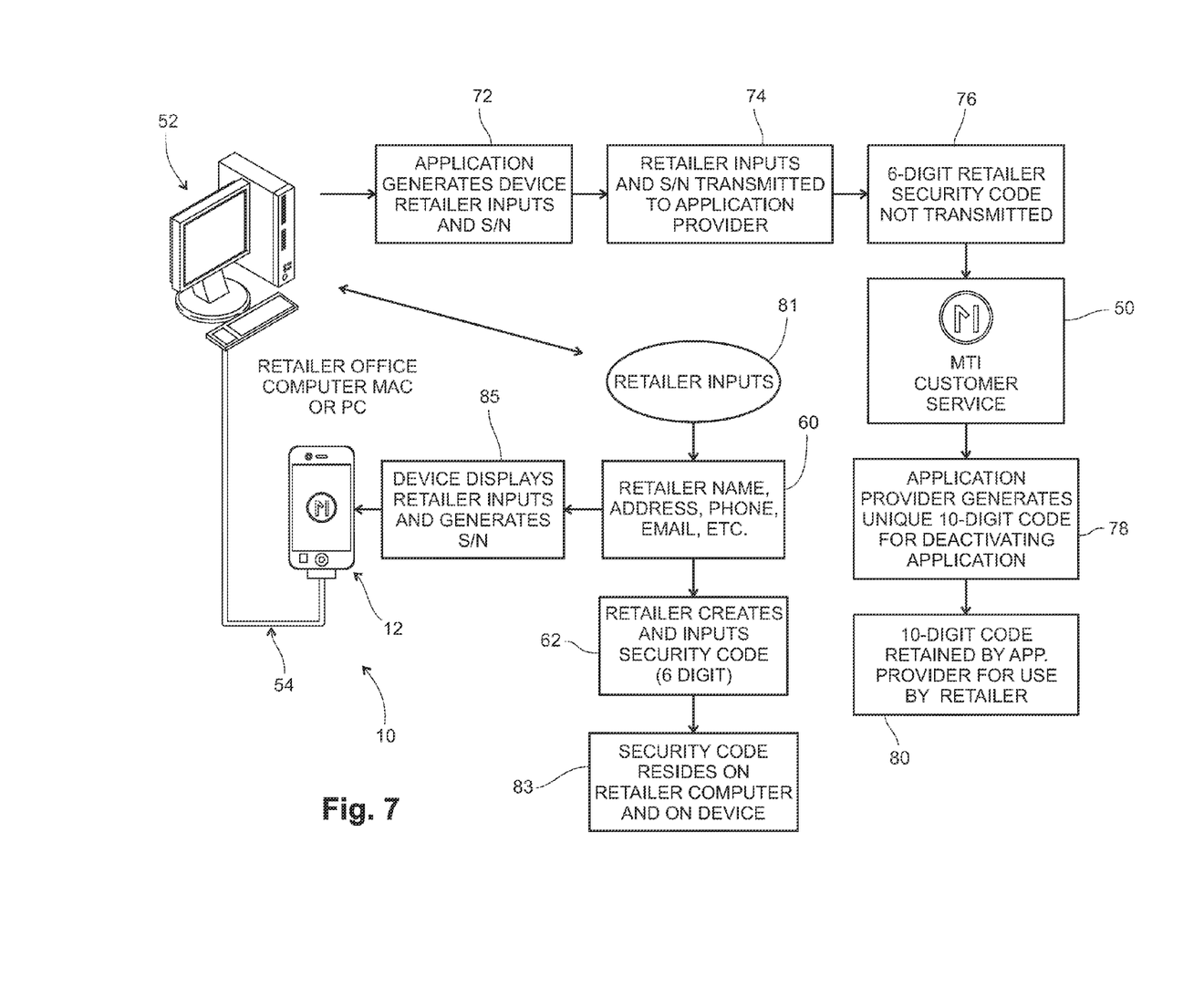
FIG. 7 is another system flowchart, similar to FIG. 6.

First, in preferred form, the software that operates the device 12 is downloadable from an application provider, indicated schematically at 50 (see, also, item 50 in FIG. 7). In preferred form, the retailer will have an on-site office computer (Mac or PC), as indicated at 52. The retailer downloads the app from the app provider to the retailer's office computer 52. Then, when it is desired to put the app on the device 12, the device 12 is connected to the office computer 52 via a USB connection 54 or other suitable means.

The retailer programs each device 12 that is displayed ("point of sale") at the retail location. Referring to the block diagram in FIG. 6, after the app is downloaded from the app provider (item 56), the retailer installs and configures the app (58). This involves having the retailer input items of information like retailer name, address, or applicable phone numbers, email, etc. (60). The retailer also inputs a security code that is created by the retailer. Preferably, the security code is 6-digits in length and unique to a specific device (62).

At that point, the app generates a unique device serial number (S/N) and a backup security code (preferably, 10-digits) (see item 64). The backup security code (10-digit) will be used if, for some reason, the retailer loses track of the retailer-generated 6-digit code.

The app transmits the retailer's input information, including S/N and backup security code to the application provider 50. This is schematically indicated at 66 and 68, respectively. At that point, the security app arms and runs in the background on the device 12 (see item 70).

To further explain the above, and referring now to FIG. 7, in preferred form, only the retailer inputs (name, address, etc.) and the application-generated S/N, are transmitted to the application provider. The 6-digit retailer security code is not transmitted to the application provider but is retained by the retailer's office computer 52, or the like. This is schematically reflected at 72, 74, 76, respectively, in FIG. 7. The application provider then generates the 10-digit code which is retained on-site by the provider (items 78, 80) as a fail-safe code that can be used, if needed. A skilled person will appreciate that this can be done in different ways.

The retailer inputs were previously described, which are also generally indicated at 81 in FIG. 7. However, the 6-digit security code resides on the device 12 and retailer computer 52 (see item 83 in FIG. 7). The device 12 also may display the retailer inputs and generated S/N for the device (item 85 in FIG. 7).

Figure 9:
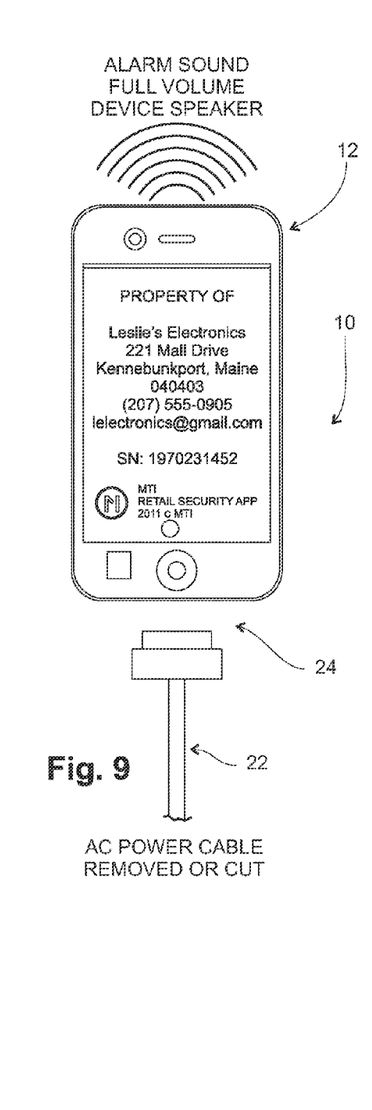
FIG. 9 is a schematic that illustrates how a hand-held outputs an alarm sound as a result of a theft event.
Figure 10:
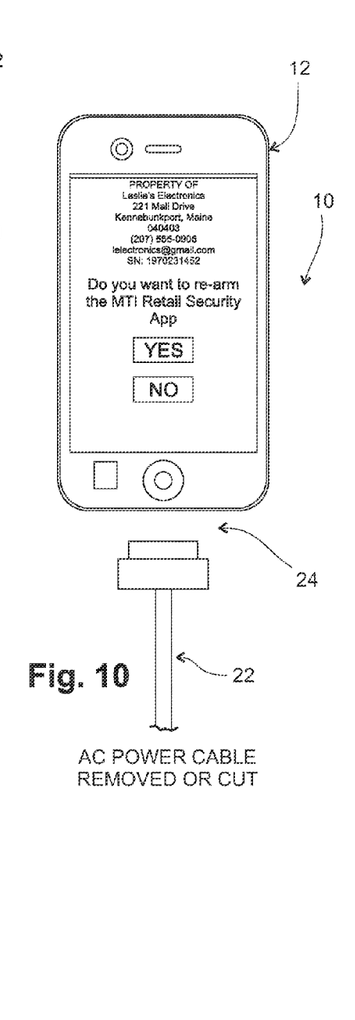
FIG. 10 illustrates a user interface on the hand-held for re-arming the hand-held.
Figure 11:
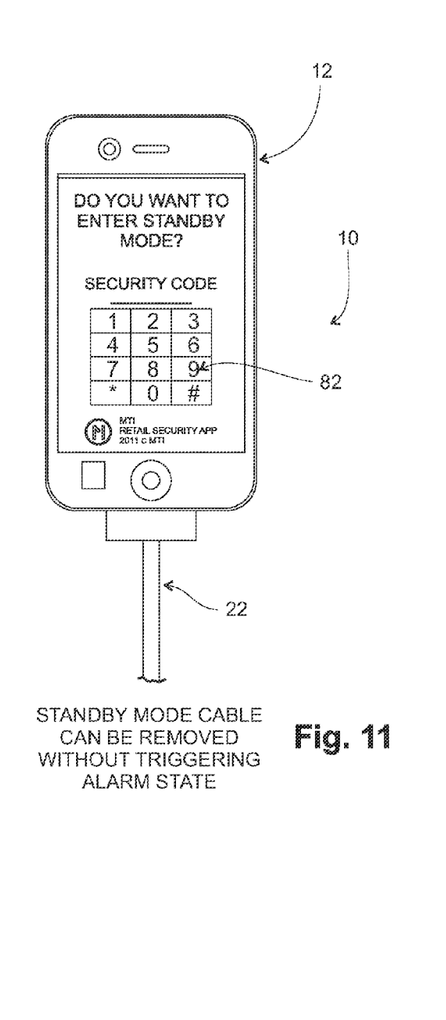
FIG. 11 is a view like FIG. 10, and shows a user interface for entering standby mode.

The retailer uses the 6-digit code on-site to arm or disarm the security function on the device 12. Referring to FIGS. 9-11, for example, a typical hand-held cell phone will have a touch screen for inputting data and/or displaying information. The device 12 will display an icon or other similar indicia that the salesperson can push on the screen, in order to display a keypad for arming or disarming the device 12. This is generally illustrated in FIG. 11, where item 82 points to the keypad. Other information can be displayed on the screen such as, for example, whether or not the user wishes to arm or disarm the device or enter standby mode (see FIG. 10).

Figure 8:
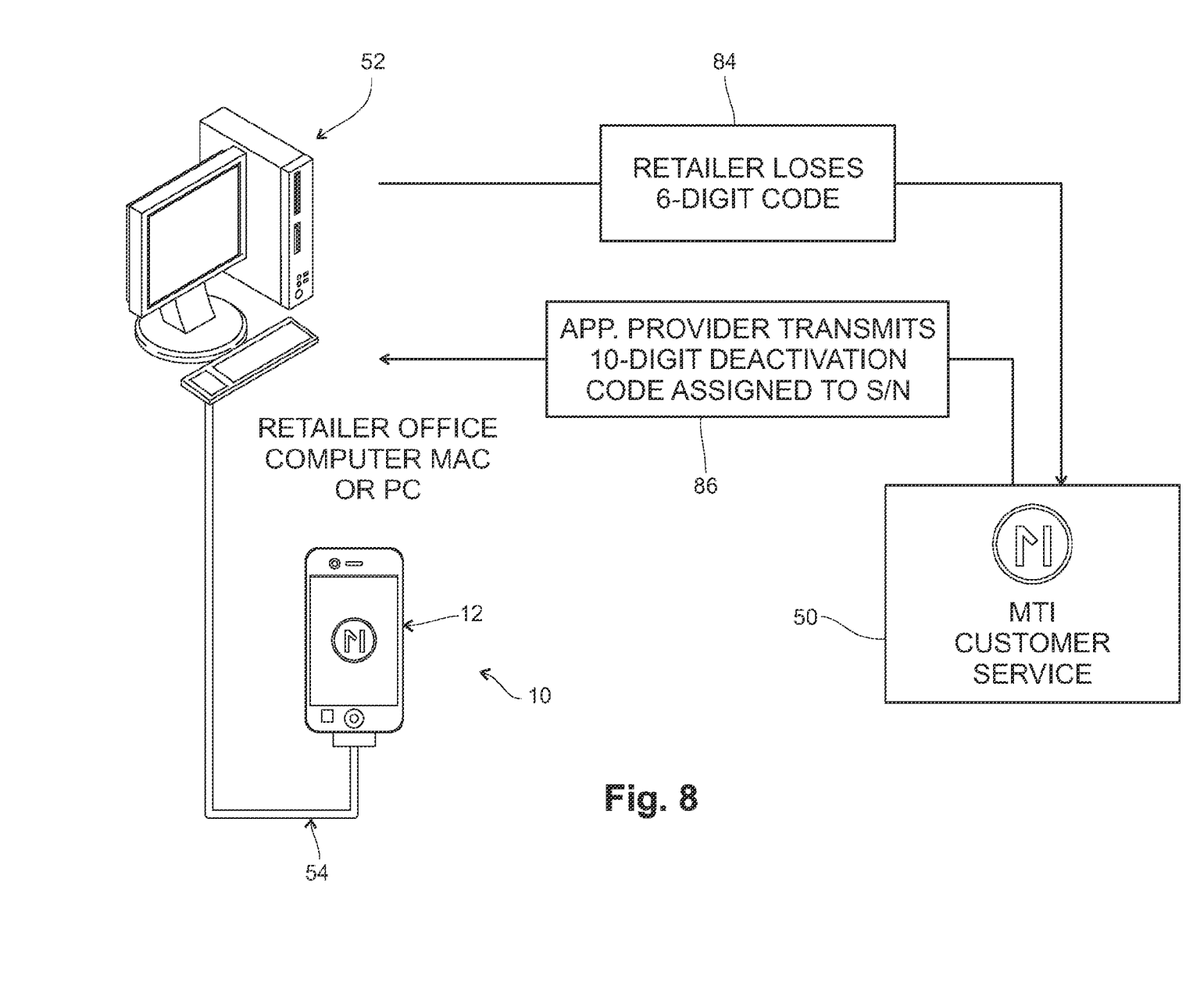
FIG. 8 is another system flowchart, similar to FIGS. 5 and 6.

If the retailer should lose the 6-digit arm/disarm code, then the retailer communicates that event to the app provider 50 (see item 84 in FIG. 8). At that point, the provider 50 returns the deactivation code assigned to the specific device S/N (item 86).

In summary, the system 10, as described above, allows a store manager or salesperson to easily input security activation codes for each hand-held displayed for sale. The security code allows the salesperson to arm or disarm the device. When armed, the device reacts to a security breach (i.e., cutting of the adaptor cable 22) by outputting an alarm. The device 12 may signal such alarm event in a variety of different ways, as described above. For example, the device may output allowed audio signal that warns the store that the hand-held device 12 has been removed. As the sophistication of hand-helds is taken advantage of or as it develops further in time, it is possible to cause the hand-held to communicate the theft event in numerous different ways, including text messaging, automated voicemail messages, and it is even possible to have a hand-held output GPS locations as the device is carried by the thief. One other permutation is to cause the hand-held to shutdown completely. Still another permutation is to cause the hand-held to shutdown but silently output alarm signals to the user.

Having the security code, the salesperson can easily disarm security on the hand-held, on an individual basis, for swapping out old models with new ones or making the other kinds of changes that are needed in the store.

The foregoing description is intended to convey the best mode for carrying out the invention, as it is presently known. This invention remains in development and it is conceivable many kinds of changes could be made to it without departing from the spirit and scope of what is considered to be a patentable invention. The legal scope of the patent right, therefore, should not be defined or limited by the foregoing description. Instead, the patent right should be limited only by the patent claim or claims that follow, the interpretation of which is to be made in accordance with the standard doctrines of patent claim interpretation.

What is claimed is:

1. A security and product display system for use in retailing electronic products, comprising:
   a mobile, hand-held electronics device adapted for wireless communication, the device being offered for sale at a point of display at a retail location that is accessible to purchasing members of the public;
   a mounting member, normally secured to the device when the device is displayed for sale, the mounting member providing a platform for supplying device power;
   an adaptor cable electrically connecting the device to the mounting member, said adaptor cable creating a detectable electrical circuit; and further,
   the mobile device being programmable by the retailer to detect a break in the circuit at the point of display and to generate an alarm event upon such detection, and including
   programming means for generating a serial number unique to said mobile device, said serial number being transferable to another physical location that is independent of the location where said mobile device is located, said other physical location including means for generating an independent backup code for use in arming or disarming said device.

2. The security and product system of claim 1, wherein said mobile device is programmed to have a retailer input code, said input code being input on a mobile device touch-screen, for respectively arming and disarming said security and product display system.

3. The product and security system of claim 1, wherein said alarm event is characterized by deactivation of normal mobile device functions.

4. The product and security system of claim 1, wherein said alarm event is characterized by outputting a sound from said mobile device.

5. The security and product system of claim 1, wherein said mobile, hand-held electronics device is a cell phone.

6. The product and security system of claim 1, wherein said mobile, hand-held electronics device is a tablet device.

7. The product and security system of claim 1, wherein said mobile, hand-held electronics device is a GPS device.

* * * * *